(12) United States Patent
Tsukahara et al.

(10) Patent No.: US 9,541,761 B2
(45) Date of Patent: Jan. 10, 2017

(54) IMAGING APPARATUS AND IMAGING METHOD

(71) Applicant: SONY CORPORATION, Tokyo (JP)

(72) Inventors: Tsubasa Tsukahara, Tokyo (JP); Kazuyuki Yamamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/607,261

(22) Filed: Jan. 28, 2015

(65) Prior Publication Data

US 2015/0226969 A1  Aug. 13, 2015

(30) Foreign Application Priority Data

Feb. 7, 2014  (JP) .................................. 2014-021833

(51) Int. Cl.
| | | |
|---|---|---|
| *G02B 27/22* | (2006.01) | |
| *G02B 27/01* | (2006.01) | |
| *G02B 27/00* | (2006.01) | |
| *H04N 5/232* | (2006.01) | |
| *H04N 13/04* | (2006.01) | |
| *H04N 13/02* | (2006.01) | |

(52) U.S. Cl.
CPC ....... *G02B 27/0172* (2013.01); *G02B 27/0093* (2013.01); *G02B 27/0101* (2013.01); *H04N 5/2329* (2013.01); *H04N 5/23293* (2013.01); *H04N 13/044* (2013.01); *H04N 13/0497* (2013.01); *G02B 2027/0134* (2013.01); *H04N 13/0203* (2013.01); *H04N 2213/001* (2013.01)

(58) Field of Classification Search
CPC .. H04N 13/02; H04N 5/2329; H04N 5/23293; H04N 12/0203; H04N 13/044; H04N 13/0497; H04N 2213/001; A61B 3/032; A61B 3/036; A61B 3/08; A61B 3/0033; G02B 27/0172; G02B 27/0101; G02B 27/0093; G92B 2027/0134
USPC ........................................... 359/462; 348/47
See application file for complete search history.

(56) References Cited

U.S. PATENT DOCUMENTS

2007/0200927 A1* 8/2007 Krenik ................... A61B 3/032
                                                         348/47

FOREIGN PATENT DOCUMENTS

| JP | 2001-281520 A | 10/2001 |
|---|---|---|
| JP | 2005-223750 A | 8/2005 |
| JP | 2006-033437 A | 2/2006 |
| JP | 2010-206673 A | 9/2010 |
| JP | 2012-042654 A | 3/2012 |

OTHER PUBLICATIONS

Office Action received for Japanese Patent application No. 2014-021833, mailed on Sep. 15, 2016, 4 pages of office action.

* cited by examiner

*Primary Examiner* — Euncha Cherry
(74) *Attorney, Agent, or Firm* — Chip Law Group

(57) ABSTRACT

Provided is an imaging apparatus including: an imaging unit; a display unit, through which at least a part of an imaging region of the imaging unit can be seen in a see-through manner and which is configured to display a stereoscopic image formed of a left eye image and a right eye image; a focal distance adjustment unit configured to adjust a focal distance of the imaging unit; and a display controller configured to generate the left eye image and the right eye image such that a display object indicating the focal distance is seen at a depth position corresponding to the focal distance and cause the display unit to display the left eye image and the right eye image.

15 Claims, 8 Drawing Sheets

IMAGING APPARATUS AND IMAGING METHOD

CROSS REFERENCE TO RELATED APPLICATIONS

This application claims the benefit of Japanese Priority Patent Application JP 2014-021833 filed Feb. 7, 2014, the entire contents of which are incorporated herein by reference.

BACKGROUND

The present disclosure relates to an imaging apparatus and an imaging method and in particular to an imaging apparatus and an imaging method by which a focal distance can be more easily known.

In recent years, a see-through head mounted display (HMD) has been developed. For example, a see-through HMD that expresses a depth by adjusting a binocular disparity or convergence has been proposed (e.g., see Japanese Patent Application Laid-open No. 2012-42654). Further, there has been proposed adding an imaging function to such a see-through HMD for imaging a subject of a real space viewed by a user through the see-through HMD.

SUMMARY

However, it is difficult for such a see-through HMD to check whether or not focus is achieved on a desired subject in a captured image and there is a fear that cumbersome processes are necessary for obtaining a desired imaging result.

In view of the above-mentioned circumstances, it is desirable to more easily know a focal distance.

According to an embodiment of the present technology, there is provided an imaging apparatus including: an imaging unit; a display unit, through which at least a part of an imaging region of the imaging unit can be seen in a see-through manner and which is configured to display a stereoscopic image formed of a left eye image and a right eye image; a focal distance adjustment unit configured to adjust a focal distance of the imaging unit; and a display controller configured to generate the left eye image and the right eye image such that a display object indicating the focal distance is seen at a depth position corresponding to the focal distance and cause the display unit to display the left eye image and the right eye image.

The display controller may be configured to set a size of the display object according to the focal distance.

The display unit may include a left eye image display unit configured to display the left eye image, and a right eye image display unit configured to display the right eye image.

The imaging apparatus may include a casing that is mounted on a head of a user such that the left eye image display unit is positioned near in front of a left eye of the user and the right eye image display unit is positioned near in front of a right eye of the user.

The display controller may be configured to cause the display unit to further display an image indicating an imaging field angle of the imaging unit.

The focal distance adjustment unit may be configured to be operated by a user to adjust the focal distance.

The imaging apparatus may further include a distance measurement unit configured to measure a distance to a subject, in which the focal distance adjustment unit may be configured to adjust the focal distance to the distance measured by the distance measurement unit.

The distance measurement unit may be configured to measure a distance to the subject at a predetermined position in the imaging region.

The predetermined position may be a position in the imaging region, which is seen at a center of a display region of the display unit.

The imaging apparatus may further include a face detector configured to detect a face of the subject, in which the distance measurement unit may be configured to measure a distance to the face of the subject detected by the face detector.

The imaging apparatus may further include a line-of-sight detector configured to detect a line-of-sight direction of the user, in which the distance measurement unit may be configured to measure a distance to the subject in the line-of-sight direction of the user detected by the line-of-sight detector.

The imaging apparatus may further include an instruction reception unit configured to receive an execution instruction of measurement of the distance to the subject, in which the distance measurement unit may be configured to measure the distance to the subject based on the execution instruction received by the instruction reception unit.

According to another embodiment of the present technology, there is provided an imaging method including: adjusting a focal distance of an imaging unit; generating a left eye image and a right eye image such that a display object indicating the focal distance is seen at a depth position corresponding to the focal distance and causing a display unit, through which at least a part of an imaging region of the imaging unit can be seen in a see-through manner and which is configured to display a stereoscopic image formed of the left eye image and the right eye image, to display the left eye image and the right eye image; and imaging a subject by the imaging unit.

In the embodiments of the present technology, a focal distance of an imaging unit is adjusted. A left eye image and a right eye image are generated such that a display object indicating the focal distance is seen at a depth position corresponding to the focal distance and the left eye image and the right eye image are displayed on a display unit, through which at least a part of an imaging region of the imaging unit can be seen in a see-through manner and which is configured to display a stereoscopic image formed of the left eye image and the right eye image. A subject is imaged by the imaging unit.

According to the embodiments of the present technology, it is possible to image a subject. Further, according to the embodiments of the present technology, it is possible to more easily know a focal distance.

These and other objects, features and advantages of the present disclosure will become more apparent in light of the following detailed description of best mode embodiments thereof, as illustrated in the accompanying drawings.

DETAILED DESCRIPTION OF EMBODIMENTS

Figure 1:
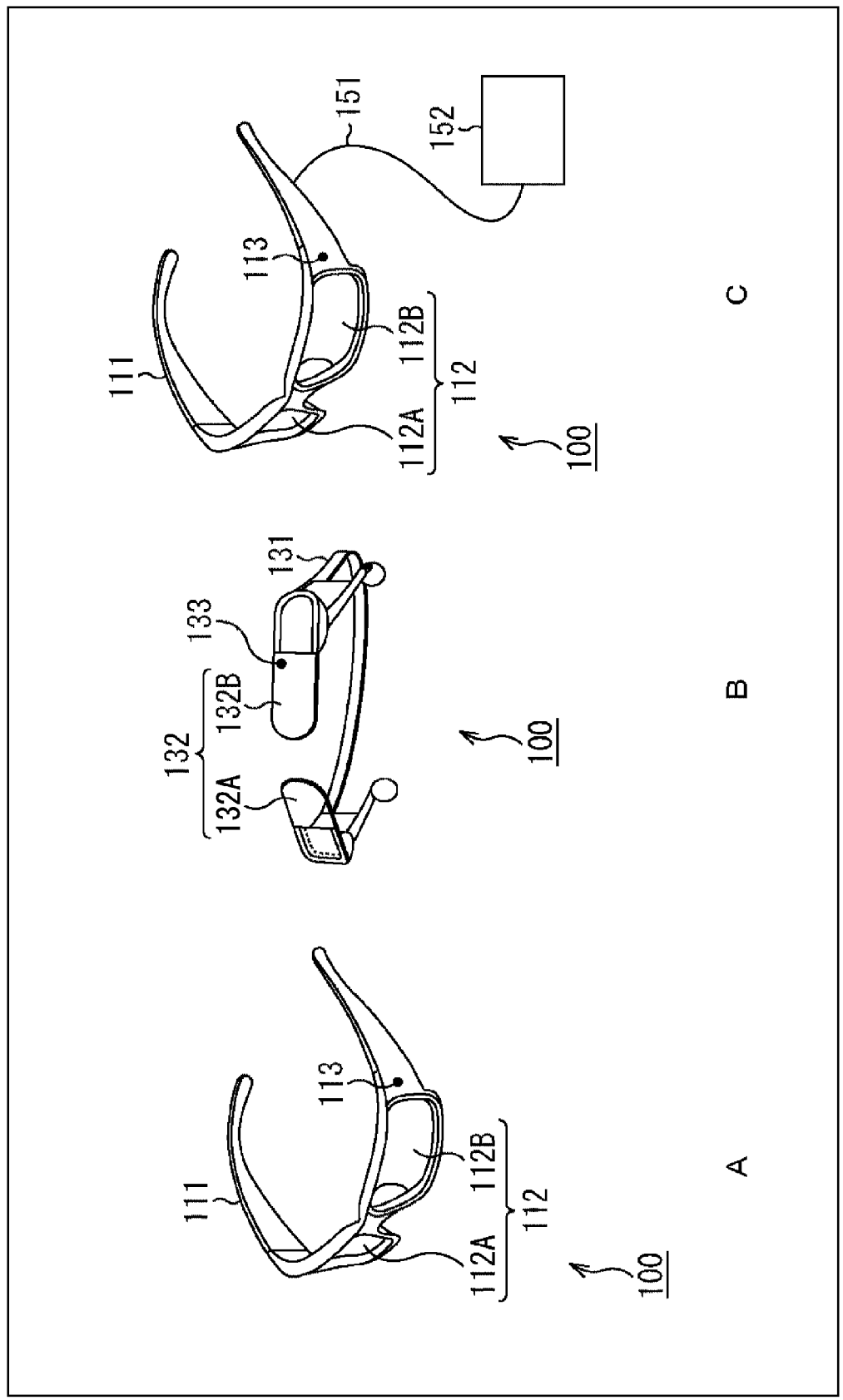
FIG. 1 is a view showing an example of an outer appearance of a see-through HMD.

Hereinafter, embodiments for carrying out the present disclosure (hereinafter, referred to as embodiments) will be described. Note that descriptions thereof will be given in the following order.

1. First Embodiment (Imaging Apparatus)
2. Second Embodiment (See-Through HMD)

<1. First Embodiment>
<Checking Imaging Result by See-Through Display>

In recent years, a see-through head mounted display (HMD) has been developed. The see-through HMD uses a display unit (see-through display) that permits light from a rear side to pass such that a landscape of a real space on the rear side of the display unit can be seen in a see-through manner. With this, a user of the see-through HMD can see an image displayed on the see-through display in an overlapping state with the landscape of the real space on the rear side of the see-through display (hereinafter, also referred to as see-through picture).

There has been proposed adding an imaging function (camera) to such a see-through HMD for imaging a subject of a real space viewed by the user through the see-through HMD (in other words, imaging apparatus with see-through display). For example, there has been proposed a use case where the user who wears the see-through HMD having the imaging function (camera) takes a picture of a subject by the camera of the HMD as a life log and share the obtained captured image over a network.

By the way, from the past, for checking whether or not focus is achieved on a desired subject when taking a picture of the subject, the user had to check an imaging result (captured image). The captured image can be checked by, for example, the see-through HMD or another device.

For example, in the case where a captured image is displayed and checked on a display unit of another device such as a smart phone, the user has to prepare the other device and transfer data of the captured image from the see-through HMD to the other device. The cumbersome processes are necessary only for checking the captured image.

Further, for example, in the case where a captured image is displayed and checked on the see-through display of the see-through HMD, the user has to check the captured image in an overlapping state with a landscape of the real space (see-through picture). Thus, it is difficult to clearly view the captured image and there is a fear that a small error, for example, focus deviation of the captured image may be overlooked.

As described above, for example, in the case of the imaging apparatus with the see-through display like the see-through HMD, it is not possible to easily check a focal distance of a captured image (check whether or not focus is achieved on a desired subject, for example). Thus, an imaging failure, for example, focus deviation (state in which focus is not achieved on the desired subject) easily occurs. Therefore, cumbersome processes including checking an image, re-taking the image, and the like are necessary for obtaining a desired imaging result.

<Imaging Apparatus>

In view of this, there are provided an imaging unit, a display unit, a focal distance adjustment unit, and a display controller. Through the display unit, at least a part of an imaging region of the imaging unit can be seen in a see-through manner. The display unit is configured to display a stereoscopic image formed of a left eye image and a right eye image. The focal distance adjustment unit is configured to adjust a focal distance of the imaging unit. The display controller is configured to generate the left eye image and the right eye image such that a display object indicating the focal distance is seen at a depth position corresponding to the focal distance and cause the display unit to display the left eye image and the right eye image.

That is, the imaging apparatus adjusts the focal distance of the imaging unit and generates the left eye image and the right eye image of the stereoscopic image such that the display object indicating the focal distance is seen at the depth position corresponding to the focal distance. The left eye image and the right eye image are displayed on the display unit through which the at least part of the imaging region of the imaging unit can be seen in a see-through manner and which is configured to display the stereoscopic image formed of the left eye image and the right eye image. Then, a subject is imaged by the imaging unit.

That is, the display object indicating the focal distance (hereinafter, also referred to as focus icon) is displayed on the display unit (see-through display) as the stereoscopic image.

The stereoscopic image is an image that looks three-dimensional to a user who views the image and recognizes a positional relationship in a depth direction (depth feeling). The stereoscopic image is formed of, for example, images with a plurality of viewpoints. Disparity and convergence angle between the images express the depth feeling. The stereoscopic image is, for example, formed of a left eye image and a right eye image mainly viewed by the left and right eyes of the user, respectively.

The focus icon that is such a stereoscopic image is displayed on the see-through display. The position of the displayed focus icon in the depth direction (hereinafter, also referred to as depth position) expresses the focal distance.

With this configuration, the user can easily check the focal distance based on the depth position of the focus icon displayed on the see-through display. For example, the user can easily check whether or not focus is achieved on a desired subject by judging whether or not the depth position of the focus icon coincides with a depth position of the subject of the real space in the see-through picture. Thus, the imaging apparatus is capable of reducing imaging failures, for example, focus deviation (state in which focus is not achieved on the desired subject). Consequently, the user can more easily obtain a desired imaging result.

Note that the focus icon can have any shape. For example, the focus icon may have a cross, rectangular, or circular shape or may have another shape. Further, a single focus icon may be provided or a plurality of focus icons may be provided.

The display controller of the imaging apparatus may be configured to set a size of the display object according to the focal distance. For example, the size of the focus icon may be reduced as the focal distance increases (in other words, the size of the focus icon may be increased as the focal distance decreases). That is, the focal distance may be expressed using the depth position and size of the focus icon.

With this configuration, the user can check the focal distance more intuitively and more accurately (e.g., the user can check whether or not focus is achieved on a desired subject more easily and more accurately). Thus, the imaging apparatus is capable of reducing imaging failures, for example, focus deviation (state in which focus is not achieved on the desired subject). Consequently, the user can more easily obtain a desired imaging result.

Further, the display unit of the imaging apparatus may include a left eye image display unit configured to display the left eye image and a right eye image display unit configured to display the right eye image. With this configuration, the user views the left eye image display unit with the left eye and views the right eye image display unit with the right eye, to thereby be able to view the focus icon as the stereoscopic image (with depth feeling). That is, the imaging apparatus is capable of providing the user with the stereoscopic image without needing polarizing spectacles or the like.

The imaging apparatus may include a casing that is mounted on a head of a user such that the left eye image display unit is positioned near in front of a left eye of the user and the right eye image display unit is positioned near in front of a right eye of the user. That is, the imaging apparatus can be embodied as a so-called HMD (see-through HMD).

The display controller of the imaging apparatus may be configured to cause the display unit to further display an image indicating an imaging field angle of the imaging unit. With this configuration, the user can easily know a range of an imaging region (range of captured image). Note that the image can be seen at any distance in the depth direction. For example, the image may be seen in the forefront. Alternatively, this image does not need to produce a depth feeling (does not need to be a stereoscopic image).

The focal distance adjustment unit of the imaging apparatus may be configured to be operated by a user to adjust the focal distance. That is, the focal distance may be adjusted according to a user's operation (so-called manual focus). Specifically, in this case, for example, when the user manually adjusts the focal distance, the depth position of the focus icon is changed according to the focal distance changed by the operation. By performing an operation while viewing the depth position of the focus icon, the user can adjust the focal distance while checking the focal distance. Thus, the user can adjust the focal distance to a desired depth position more easily and more accurately.

The imaging apparatus may further include a distance measurement unit configured to measure a distance to the subject, in which the focal distance adjustment unit may be configured to adjust the focal distance to the distance measured by the distance measurement unit. That is, the focal distance may be adjusted by the imaging apparatus (so-called autofocus). In this case, the user can check the focal distance by viewing the depth position of the focus icon. That is, the user can check an autofocus result (e.g., whether or not focus is achieved at a desired distance) more easily and accurately.

The distance measurement unit of the imaging apparatus may be configured to measure a distance to the subject at a predetermined position in the imaging region. For example, the predetermined position may be a position in the imaging region, which is seen at a center of the display region of the display unit. Of course, the predetermined position may be any position as long as it is defined in advance. The predetermined position is not limited to the position in the imaging region, which is seen at the center of the display region of the display unit. Thus, the position of the subject in the display region, whose distance is to be measured, is fixed, and hence the user can easily set the subject as the distance measurement target by adjusting the attitude (position, orientation, etc.) of the imaging apparatus such that the desired subject is located at that position (e.g., center of display region).

The imaging apparatus may further include a face detector configured to detect a face of the subject in which the distance measurement unit may be configured to measure a distance to the face of the subject detected by the face detector. With this configuration, focus can be easily achieved on the face of the subject.

The imaging apparatus may further include a line-of-sight detector configured to detect a line-of-sight direction of the user. The distance measurement unit may be configured to measure a distance to the subject in the line-of-sight direction of the user detected by the line-of-sight detector. With this configuration, the user can easily set the subject as the distance measurement target only by directing the line-of-sight to the desired subject.

The imaging apparatus may further include an instruction reception unit configured to receive an execution instruction of measurement of the distance to the subject. The distance measurement unit may be configured to measure the distance to the subject based on the execution instruction received by the instruction reception unit. With this configuration, only if the user issues an instruction, the distance measurement (i.e., also focal distance adjustment) can be performed. That is, the focal distance can be fixed unless the user issues an instruction. With this, for example, the user can change the imaging direction and the like while maintaining the focal distance after the focal distance is adjusted.

Note that the above-mentioned display object indicating the focal distance may be displayed on a non-see-through display unit that does not permits light to pass. For example, the non-see-through display unit may display a display object (focus icon) with the display object (focus icon) being overlapped on a captured image (also referred to as through-image) obtained by the imaging unit. Also in this case, as in the case where the display object is displayed on the see-through display unit as described above, it is only necessary to generate a left eye image and a right eye image and cause the display unit to display them such that the display object is seen at a depth position corresponding to a focal distance.

That is, the above-mentioned phrase "seeing at least a part of the imaging region of the imaging unit in a see-through manner" includes not only "seeing the landscape of the real space on the rear side of the display through the display" as in the see-through display but also "seeing the through-image obtained by the imaging unit and displayed on the display" as in the above-mentioned non-see-through display.

<2. Second Embodiment>

Outer Appearance of See-Through HMD

The present technology is also applicable to an apparatus other than the imaging apparatus. For example, the present technology may be applied to the see-through HMD. FIG. 1 is a view showing an example of an outer appearance of a see-through HMD as an embodiment of the imaging apparatus to which the present technology is applied. For example, as shown in "A" of FIG. 1, a casing 111 of a see-through HMD 100 has a so-called eyeglass shape. Like eyeglasses, the see-through HMD 100 is put on a face of the user with ends of the casing 111 resting on ears of the user and used.

The portions corresponding to lenses of the eyeglasses are display units 112 (right eye display unit 112A and left eye display unit 112B). When the user wears the see-through HMD 100, the right eye display unit 112A is positioned near in front of the right eye of the user and the left eye display unit 112B is positioned near in front of the left eye of the user.

The display unit 112 is a see-through display that permits light to pass. Thus, the right eye of the user can see, through the right eye display unit 112A, a rear side thereof, that is, the landscape of the real space (see-through picture) in front of the right eye display unit 112A. Similarly, the left eye of the user can see, through the left eye display unit 112B, a rear side thereof, that is, the landscape of the real space (see-through picture) in front of the left eye display unit 112B. Thus, the user see an image displayed on the display unit 112 while the image overlapping on the landscape of the real space in front of the display unit 112.

The right eye display unit 112A displays an image (right eye image) for the right eye of the user. The left eye display unit 112B displays an image (left eye image) for the left eye of the user. That is, the display unit 112 is capable of displaying different images to the right eye display unit 112A and the left eye display unit 112B and displaying a stereoscopic image, for example.

The stereoscopic image is an image that is formed of the right eye image and the left eye image both having binocular disparity and convergence angle and looks far or close from/to the user by controlling the binocular disparity and convergence angle. That is, it is possible to control the depth position of the stereoscopic image. Note that the depth position of the stereoscopic image is not a position at which the image is actually displayed but a virtual position at which the image is seen by the user as if it is present (also referred to as virtual image position).

That is, the display unit 112 is capable of displaying an image (stereoscopic image) such that the user can see the image as if it is present in the real space in front of the display unit 112 as viewed from the user.

Further, as shown in FIG. 1, a hole 113 is provided near the display unit 112 of the casing 111. Inside the casing 111 near the hole 113, there is provided an imaging unit that images a subject. The imaging unit images through the hole 113 a subject of the real space in front of the see-through HMD 100 (in front of the see-through HMD 100 as viewed by the user who wears the see-through HMD 100). More specifically, the imaging unit images a subject of the real space, which is positioned in the display region of the display unit 112 (right eye display unit 112A and left eye display unit 112B) as viewed from the user. With this, image data of the captured image is generated. The generated image data is, for example, stored in a predetermined storage medium or transmitted to another device.

Note that the hole 113 (i.e., imaging unit) can be located at any position and may be located at a position other than that of the example shown in "A" of FIG. 1. Further, any number of holes 113 (i.e., imaging units) can be provided. Only one hole 113 (i.e., imaging unit) may be provided as shown in "A" of FIG. 1 or a plurality of holes 113 (i.e., imaging units) may be provided.

Further, the casing 111 can have any shape as long as it can be mounted on the face (head) of the user such that the right eye display unit 112A is positioned near in front of the right eye of the user and the left eye display unit 112B is positioned near in front of the left eye of the user. For example, the see-through HMD 100 may have a shape as shown in "B" of FIG. 1.

In the case of the example of "B" of FIG. 1, a casing 131 of the see-through HMD 100 is formed in a shape sandwiching and fixing the head of the user from the back. Also the display unit 132 in this case is a see-through display similar to the display unit 112. That is, a display unit 132 also includes a right eye display unit 132A and a left eye display unit 132B. When the user wears the see-through HMD 100, the right eye display unit 132A is positioned near in front of the right eye of the user and the left eye display unit 132B is positioned near in front of the left eye of the user.

The right eye display unit 132A is a display unit similar to the right eye display unit 112A. The left eye display unit 132B is a display unit similar to the left eye display unit 112B. That is, the display unit 132 is also capable of displaying a stereoscopic image like the display unit 112.

Further, also in the case of "B" of FIG. 1, a hole 133 similar to the hole 113 is provided near the display unit 132 of the casing 131 as in the case of "A" of FIG. 1. Inside the casing 131 near the hole 133, there is provided an imaging unit that images a subject. The imaging unit images through the hole 133 a subject of the real space in front of the see-through HMD 100 (in front of the see-through HMD 100 as viewed by the user who wears the see-through HMD 100) as in the case of "A" of FIG. 1.

Of course, the hole 133 (i.e., imaging unit) can be located at any position as in the case of "A" of FIG. 1 and may be located at a position other than that of the example shown in "B" of FIG. 1. Further, any number of holes 133 (i.e., imaging units) can be provided as in the case of "A" of FIG. 1.

Further, as in the example shown in "C" of FIG. 1, some of the components of the see-through HMD in the example of "A" of FIG. 1 may be configured as those separate from the casing 111. In the case of the example of "C" of FIG. 1, the casing 111 is connected to a control box 152 via a cable 151.

The cable 151 is a communication path for predetermined wired communication and electrically connected to a circuit inside the casing 111 and a circuit inside the control box 152. The control box 152 includes some of the components (circuit, etc.) inside the casing 111 in the case of the example of "A" of FIG. 1. For example, the control box 152 may include a controller and a storage unit or the like that stores image data. The circuit inside the casing 111 may communicate with the circuit inside the control box 152. The imaging unit inside the casing 111 may perform imaging under the control of the controller of the control box 152. The image data of the captured image obtained by imaging may be supplied to the control box 152 and stored in the storage unit.

The control box 152 can be put in a pocket or the like of the clothes of the user, for example. With this configuration, the casing 111 of the see-through HMD 100 can be downsized in comparison with the case of "A" of FIG. 1.

Note that the communication between the circuit inside the casing 111 and the circuit inside the control box 152 may be wired or wireless. In the case of the wireless communication, the cable 151 can be omitted.

<Inner Configuration Example>

Figure 2:
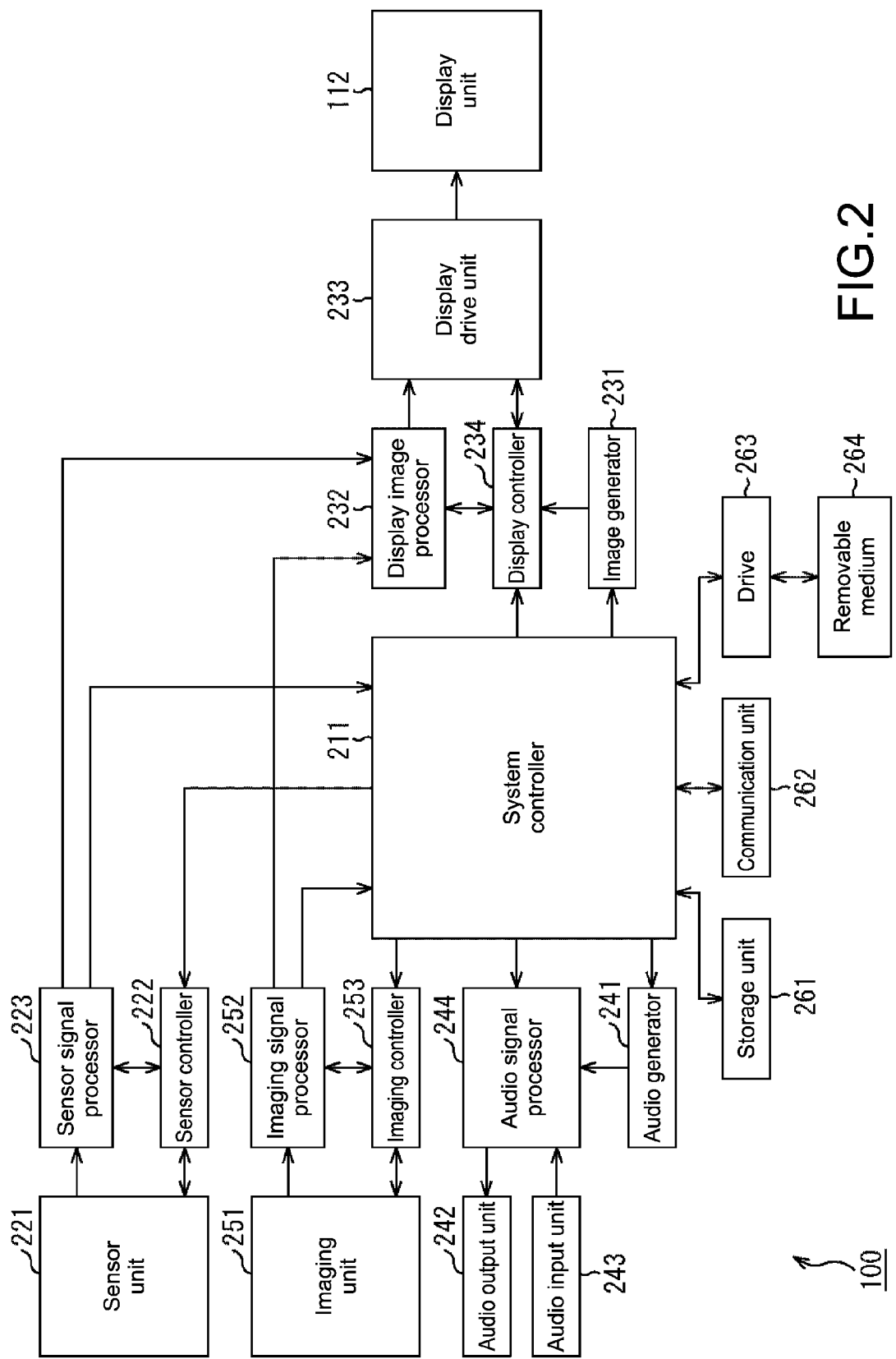
FIG. 2 is a block diagram showing a main configuration example of the see-through HMD.

FIG. 2 is a block diagram showing an inner configuration example of the see-through HMD 100. As shown in FIG. 2, the see-through HMD 100 includes a system controller 211.

The system controller 211 is, for example, configured by a micro computer including a central processing unit (CPU), a read only memory (ROM), a random access memory (RAM), a non-volatile memory unit, an interface, and the like and controls the respective sections of the see-through HMD 100. The system controller 211 controls the respective sections based on an inner operation program. For example, the system controller 211 controls the respective sections and performs display control on an image to be displayed on the display unit 112.

Further, the see-through HMD 100 includes a sensor unit 221, a sensor controller 222, and a sensor signal processor 223.

The sensor unit 221 includes an arbitrary sensor such as an acceleration sensor, gyro sensor, magnetic sensor, and atmospheric pressure sensor mounted near the display unit 112. The sensor unit 221 detects, for example, a motion of the head of the user, a motion of the neck, or a motion of the see-through HMD 100 as a signal corresponding to a motion of the user. Further, the sensor unit 221 includes a capacitive sensor, a button, a global positioning system (GPS), and the like. A signal of a sensor system used by the user for operating the see-through HMD 100 may also be processed by this section.

That is, the sensor unit 221 includes an arbitrary input device and receives information input via the input device. The input device can be located at any position and not limited to be positioned in the vicinity of the display unit 112.

Further, the sensor unit 221 may include a sensor that detects the line-of-sight of the user or the like. For example, as this sensor, the sensor unit 221 may be placed in vicinity of the display unit 112 and include an imaging unit (line-of-sight imaging unit) that images an eye region of the user. In this case, for example, the system controller 211 may analyze the image of the eye region of the user that is captured by the line-of-sight imaging unit, to thereby detect a line-of-sight direction, a focal distance, a degree of opening of pupils, a fundus pattern, opening/closing of eyelids, and the like. Further, instead of such a line-of-sight imaging unit, the sensor unit 221 includes a light emitting unit that is positioned near the display unit 112 and emits light to the eye region of the user and a light receiving unit that receives and photoelectrically converts the reflection light from the eye region and outputs it as an electrical signal (light receiving signal). In this case, the system controller 211 may detect the line-of-sight direction or the like based on the light receiving signal obtained by the light receiving unit. Alternatively, for example, the system controller 211 may detect a thickness of a crystalline lens of the user based on the light receiving signal obtained by converting the reflection light received by the light receiving unit into the electrical signal. That is, the sensor unit 221 may include a line-of-sight detector that detects a line-of-sight direction of the user. Any detection method can be used.

The sensor controller 222 performs sensor control regarding, for example, which sensor is driven at which timing or by which driving method the detection is performed based on an instruction from the system controller 211. Further, the sensor signal processor 223 subjects a sensor signal detected by the sensor unit 221 to various types of numerical processing such as averaging and variance calculation as pre-processing before it is output to the system controller 211.

The see-through HMD 100 needs in some cases the user's operation for power on/off, start/end of display of various information images, change in image content, display adjustment of luminance, hue, and the like, change in the display region on the display screen, and the like. For example, an operating element as an operation key or operation dial operated by the user and an operation detecting mechanism that detects an operation of the operating element may be provided, for example, as the sensor unit 221 for the operations (detection of trigger for processing operation) such that the system controller 211 can detect the user's operation.

Instead of the provision of such an operating element, the system controller 211 may judge a user's operation intention and suitable operation processing based on the situation of the user that is detected by the sensors of the sensor unit 221 (eye motion, motion and state of body, etc.), and may perform the corresponding processing.

In addition, the sensor unit 221 may be configured to detect other external world information (e.g., detection information on the surroundings of the see-through HMD 100, location, date and time, and state of the subject). The system controller 211 may determine suitable operation processing based on the external world information detected by the sensor unit 221 and perform the determined processing.

Further, the see-through HMD 100 includes an image generator 231, a display image processor 232, a display drive unit 233, and a display controller 234.

The image generator 231 generates an image signal under the control of the system controller 211. The system controller 211 causes the image generator 231 to generate an image signal that becomes an image to be presented to the user according to the content and numerical values obtained from the respective sections and generates an image signal serving as a picture image, a graph image, a literal image, or an image for giving an alarm to the user.

The display image processor 232 includes a so-called video processor and subjects the supplied image signal to various types of display processing. For example, the display image processor 232 performs luminance adjustment, color correction, contrast adjustment, sharpness (outline emphasis) adjustment, and the like of the imaging signal supplied from the imaging signal processor 252. Additionally, the display image processor 232 may set a display position on the screen. Still additionally, the display image processor 232 may perform generation of an enlarged image in which an imaging signal is partially enlarged or generation of a reduced image, image effect processing such as soft focus, mosaic, luminance inversion, highlight display (highlighting) of a part of an image, and change in entire color atmosphere, separation or combination of an image for division display of a captured image, generation of a character image or picture image, processing of combining the generated image with the captured image, and the like. The display image processor 232 supplies the processed image signal to the display drive unit 233.

Note that the display image processor 232 may perform such processing according to an instruction supplied from the display controller 234 or a sensor signal supplied from the sensor signal processor 223. Alternatively, the display image processor 232 may perform the same processing also on an image supplied from the display controller 234. For example, although the display image processor 232 is supplied with an image signal generated by the image generator 231, the display image processor 232 may perform predetermined signal processing for display also on this image signal and supplies it to the display drive unit 233.

The display drive unit 233 is configured by a pixel driving circuit for displaying an image signal supplied from the display image processor 232 on the display unit 112. That is, the display drive unit 233 applies a driving signal based on a video signal at a predetermined horizontal/vertical driving timing on each of pixels arranged in a matrix form in the display unit 112, and causes them to perform display.

Alternatively, the display drive unit 233 may also control the luminance of each pixel of the display unit 112 and put the entire screen and a part of the screen in a through-state.

The display controller 234 controls, based on an instruction of the system controller 211, a processing operation of the display image processor 232, an operation of a display driving unit, and an image displayed on each of the left and right display units, and instructs to the display image processor 232 to process a signal. Further, the display controller 234 controls the display drive unit 233 to switch between a through-state, an image display state, a single-eye display state, for example.

Further, the see-through HMD 100 includes an audio generator 241, an audio output unit 242, an audio input unit 243, and an audio signal processor 244.

According to an instruction of the system controller 211, the audio generator 241 generates an audio signal of a voice message or the like by voice synthesis processing or generates another audio signal to be presented to the user, for example, electronic sound.

The audio output unit 242 includes, for example, a speaker or earphone speaker mounted on the see-through HMD 100 and an amplifier circuit for the speaker. By an audio signal generated by the audio generator 241 being supplied to the audio output unit 242, the user can listen to a voice message, electronic sound, or the like. Note that the audio output unit 242 may be configured as a so-called bone conduction speaker.

The audio input unit 243 includes a microphone amplifier unit that amplifies an audio signal obtained by a microphone and an A/D converter and outputs audio data.

The audio signal processor 244 includes, for example, a digital signal processor and a D/A converter. The audio data obtained by the audio input unit 243 and the audio data generated by the audio generator 241 are supplied to the audio signal processor 244. The audio signal processor 244 performs processing, for example, volume control, sound quality control, or production of acoustic effects on the supplied audio data according to the control of the system controller 211. Then, the audio signal processor 244 converts the processed audio data into an analog signal and supplies it to the audio output unit 242. Note that the audio signal processor 244 is not limited to the configuration of performing digital signal processing and may process a signal through an analog amplifier and an analog filter.

The audio signal output from the audio signal processor 244 is output from the earphone speaker of the audio output unit 242 as audio. With such a configuration, the user can hear external sound collected by the audio input unit 243 and listen to sound generated by the audio generator 241.

Further, the see-through HMD 100 includes an imaging unit 251, an imaging signal processor 252, and an imaging controller 253.

The imaging unit 251 is provided with a lens system constituted of an imaging lens, a diaphragm, a zoom lens, a focus lens, and the like, a driving system for causing the lens system to perform a focus operation and a zoom operation, a solid-state imaging element array that detects imaging light obtained by the lens system and photoelectrically converts the imaging light into an imaging signal. The solid-state imaging element array is formed of, for example, a charge coupled device (CCD) sensor array and a complementary metal oxide semiconductor (CMOS) sensor array.

The imaging unit 251 images, for example, a landscape in front of the user (subject of real space in front of user) via the hole 113. Of course, the imaging unit 251 may image a landscape in another direction, for example, on the rear side of the user.

The imaging signal processor 252 includes a sample hold/automatic gain control (AGC) circuit, a video A/D converter, or the like that performs gain control or waveform shaping on a signal obtained by the solid-state imaging element of the imaging unit 251 and obtains an imaging signal as digital data. Alternatively, the imaging signal processor 252 may perform white balance processing, luminance processing, color signal processing, blur correction processing, and the like on the imaging signal.

The imaging controller 253 controls, based on an instruction from the system controller 211, operations of the imaging unit 251 and the imaging signal processor 252. For example, the imaging controller 253 controls on/off of operations of the imaging unit 251 and the imaging signal processor 252. Further, the imaging controller 253 performs control (motor control) for causing the imaging unit 251 to perform operations of autofocus, automatic exposure control, diaphragm adjustment, zoom, focus change, and the like.

Note that, if a movable mechanism capable of changing a subject direction using the imaging lens is provided, the imaging controller 253 controls the operation of the movable mechanism to change the direction of the imaging lens in the imaging unit 251 based on an instruction of the system controller 211.

Further, the imaging controller 253 includes a timing generator and controls, according to a timing signal generated by the timing generator, signal processing operations of the solid-state imaging element of the imaging unit 251 and the sample hold/AGC circuit and video A/D converter of the imaging signal processor 252. Further, variable control of the imaging frame rate can also be performed owing to this timing control.

In addition, the imaging controller 253 may control imaging sensitivity or signal processing in the solid-state imaging element of the imaging unit 251 and the imaging signal processor 252. For example, as the imaging sensitivity control, the imaging controller 253 may perform gain control of a signal read from the solid-state imaging element of the imaging unit 251, black level setting control, various types of coefficient control of imaging signal processing in a digital data phase, correction amount control in blur correction processing, and the like.

Further, the imaging controller 253 may control entire sensitivity adjustment not considering a wavelength band, a sensitivity adjustment in which the imaging sensitivity of a particular wavelength band, for example, an infrared region or a ultraviolet region is adjusted (e.g., imaging to cut particular wavelength band), or the like. For example, the sensitivity adjustment based on the wavelength can be performed by insertion of a wavelength filter in an imaging lens system or wavelength filter calculation processing with respect to an imaging signal. In these cases, the imaging controller 253 is capable of controlling the sensitivity by controlling the insertion of the wavelength filter, designating the filter calculation coefficient, or the like.

For example, a captured image signal obtained by the imaging unit 251 and the imaging signal processor 252 is supplied to the display image processor 232 together with an information image signal generated by the image generator 231. The display image processor 232 performs the above-mentioned various types of signal processing on each image signal. Further, the display image processor 232 subjects two image signals to signal processing (image combination processing) as the screen division for causing the display unit 112 to display the two image signals at the same time.

The image signals combined by the display image processor 232 is supplied to the display drive unit 233 and displayed on the display unit 112, and thus the captured image and other images are displayed on the display unit 112 at the same time. In other words, the user can view various images also while viewing the captured image.

There is a case where a user's operation is necessary for start/end of an imaging operation, a zoom operation, a focus operation, a captured image adjustment, and the like. Of course, there is also a case where a user's operation is necessary for power on/off, start/end of display of various information images, change in image content, display adjustment of luminance, hue, and the like, change of the display region on the display screen, and the like. For example, the operating element such as the operation key for the operation (operation trigger) may be provided in the sensor unit 221. Alternatively, the system controller 211 may judge a user's operation intention and suitable operation processing based on the situation of the user that is detected by various sensors of the sensor unit 221 (eye motion, motion and state of body, etc.) and perform the corresponding processing.

In addition, the sensor unit 221 may be configured to be capable of detecting external world information (detection information of surroundings of see-through HMD 100, location, date and time, situation of subject, etc.) and may determine suitable operation processing based on the external world information and perform the determined processing.

Further, the see-through HMD 100 includes a storage unit 261, a communication unit 262, and a drive 263.

The storage unit 261 includes a hard disk drive (HDD), a solid-state memory such as a flash memory, a memory card installing a solid-state memory, and an arbitrary storage medium such as an optical disc, an opto-magnetic disc, and a hologram memory and records/reproduces data on the storage medium.

For example, image data serving as an imaging signal captured by the imaging unit 251 and processed by the imaging signal processor 252, image data received by the communication unit 262, and image signals of various types of information generated by the image generator 231 may be stored in the storage unit 261. Alternatively, audio data obtained in the audio input unit 243, audio data received by the communication unit 262, and audio data generated by the audio generator 241 may also be stored in the storage unit 261.

The storage unit 261 encodes the supplied image data or audio data for storing it in the storage medium under the control of the system controller 211 and stores the encoded data to the storage medium. The storage unit 261 reproduces the image data or audio data and outputs it to another processor from the storage medium under the control of the system controller 211.

The data reproduced by the storage unit 261 can include any types of data to be display targets. For example, the data reproduced by the storage unit 261 is moving image content such as movie and a video clip, still image content captured by a digital still camera or the like and stored in the storage medium, data of an electronic book or the like, computer use data such as image data, text data, and table calculation data created by the user using a personal computer or the like, or a game image.

The communication unit 262 transmits and receives data to/from an apparatus outside the see-through HMD 100 (hereinafter, also referred to as external apparatus). As the external apparatus, there are exemplified a video camera having a communication function, an imaging apparatus such as a digital still camera, a computer apparatus, a smart phone, a smart watch, an AV apparatus such as a video storage apparatus and a television receiver, and a network server apparatus.

Further, for example, the communication unit 262 may be configured to perform network communication with a network access point via short-distance wireless communication by using a predetermined system such as a wireless local area network (LAN) and Bluetooth (registered trademark) or may directly perform wireless communication with the external apparatus having the corresponding communication function.

The data transmitted from the external apparatus to the see-through HMD 100 can include any types of data to be display targets. For example, if the external apparatus serves as an imaging apparatus, the data transmitted from the external apparatus to the see-through HMD 100 is image data captured by the imaging apparatus. If the external apparatus serves as a content source apparatus, the data transmitted from the external apparatus to the see-through HMD 100 is, for example, moving image content such as a movie and a video clip, still image content captured by a digital still camera or the like and stored in a storage medium, data of an electronic book or the like, computer use data such as image data, text data, and table calculation data created by the user using a personal computer or the like, or a game image.

Further, audio data obtained by the audio input unit 243, audio data reproduced by the storage unit, and audio data received by the communication unit 262 are supplied to an audio signal processor according to an instruction of the system controller 211.

Therefore, while wearing the device, the user can view and listen to a captured image and external sound recorded when the image is captured, view and listen to an image and audio reproduced by the storage unit, or view and listen to an image and audio received by the communication unit.

In particular, by an image of the image generator 231 being supplied to the display image processor together with the captured image, the reproduced image, or the received image, various information images are displayed together with the captured image, the reproduced image, or the received image.

At a timing at which audio data is generated by the audio generator 241, by the generated audio data being supplied to the audio signal processor 244, the user can listen to a voice message, alarm sound, or the like generated by the audio generator 241 while listening to the external sound, the reproduced sound, or the received sound, for example.

In addition to the operations of the display system and the operations related to the imaging function, the system controller has to determine triggers for operation control for play, cueing, fast-forwarding/rewinding, pause, recording, and the like in the storage unit 261 and operation control related to the transmission and reception in the communication unit 262. Also in this case, an operating element such as an operation key operated by the user may be provided in, for example, the sensor unit 221 such that processing corresponding to an operation performed on the operating element can be performed. Further, the system controller 211 may determine a user's operation intention and suitable operation processing based on the situation of the user that is detected by the sensor unit 221 (eye motion, motion and state of body, etc.) and perform the corresponding processing.

In addition, the sensor unit 221 may be configured to be capable of detecting external world information of the see-through HMD 100 (detection information of surroundings of display apparatus, location, date and time, situation of subject, etc.), and may determine suitable operation processing based on the external world information and perform the determined processing.

A removable medium 264 such as an optical disc and semiconductor memory is appropriately mounted on the drive 263. Computer programs and data are read from the removable medium 264 by the drive 263, supplied to the system controller 211, and stored or installed in the storage unit 261.

In the see-through HMD 100 having the above-mentioned configuration, as described above, the display unit 112 permits light on the rear side of the display unit 112 (in front of the display unit 112 as viewed from the user) to pass, and displays a stereoscopic image formed of images having a plurality of viewpoints in an overlapping state on the landscape of the real space on the rear side.

Further, the imaging unit 251 images the subject of the real space positioned in the display region of the display unit 112 as viewed from the user.

The imaging unit 251 has a focal distance adjustment function (focus function). For example, the imaging unit 251 may have a manual focal distance adjustment function of adjusting the focal distance according to a user's operation (also referred to as manual focus).

The image generator 231 generates a stereoscopic image indicating the focal distance of the imaging unit 251 (display object indicating focal distance, that is, left eye image and right eye image of focus icon). The display controller 234 sets the disparity and convergence angle of the focus icon such that a virtual image position of the focus icon is a depth position corresponding to the focal distance. The display controller 234 causes the display image processor 232 to apply the settings to the focus icon. The display controller 234 causes the display unit 112 to display the focus icon to which the disparity and convergence angle are set such that the depth position is the position corresponding to the focal distance.

Note that, at this time, the display controller 234 can use any method for setting the disparity and convergence angle of the focus icon. For example, Japanese Patent Application Laid-open No. HEI 08-322004 discloses a stereoscopic video display apparatus including means for shifting an image electrically displayed on a display surface in a horizontal direction such that a diopter scale and convergence are maintained substantially coincident in real time. Further, Japanese Patent Application Laid-open No. HEI 08-211332 discloses a stereoscopic video reproducing device that obtains a stereoscopic video using a binocular disparity, the device including a convergence-angle selection means for setting the convergence angle when viewing a reproducing video and a control means for controlling relative reproducing positions of left/right videos based on information related to the selected convergence angle. For example, the display controller 234 may set use either one of these methods for setting the disparity and convergence angle of the focus icon.

Alternatively, for example, the imaging unit 251 may have an automatic focal distance adjustment function of adjusting a focal distance without a user's operation (also referred to as autofocus). For example, the sensor unit 221 may include a distance measurement sensor that measures a distance to an object of the real space in front of the display unit 112 as viewed from the user and the distance measurement sensor may measure the distance to the subject imaged by the imaging unit 251. Then, the imaging controller 253 may cause the imaging unit 251 to adjust the focal distance to the distance measured by the distance measurement sensor of the sensor unit 221 (distance to subject).

Any distance measurement method for the distance measurement sensor can be used. For example, a passive type distance measurement technique using a stereo camera or an active type distance measurement technique using a distance image camera or laser camera may be used. For example, Japanese Patent Application Laid-open No. 2012-222386 discloses a method of specifying a position of a user by a stereo camera. Further, Japanese Patent Application Laid-open No. 2011-205388 discloses a calibration method for a stereo camera. The sensor unit 221 may use either one of these methods for measuring the distance to the subject.

Note that the distance measurement sensor may measure a distance to an object (subject) located at a predetermined position in an area (imaging region) imaged by the imaging unit 251. For example, the distance measurement sensor may measure a distance to a subject in the imaging region, which is located at a position seen at a center of the display region of the display unit 112 as viewed from the user. The sensor unit 221 may further include a line-of-sight detection sensor that detects a line-of-sight of the user and the distance measurement sensor may measure a distance to an object (subject) in the imaging region, which is in the line-of-sight direction of the user detected by the line-of-sight detection sensor. In addition, the sensor unit 221 may include a face detection sensor that detects a face portion of a subject in the imaging region, which is seen in the display region of the display unit 112 as viewed from the user and the distance measurement sensor may measure a distance to the face portion of the subject detected by the face detection sensor.

Also in the case where the distance measurement sensor is used to measure the distance to the subject and the focal distance is adjusted to the measured distance to the subject as described above (i.e., autofocus), the display controller 234 sets the disparity and convergence angle of the focus icon such that a virtual image position of the focus icon indicating the focal distance is a depth position corresponding to the focal distance as in the manual focus. The display image processor 232 applies the settings to the focus icon and the display unit 112 displays the thus obtained focus icon.

Note that the face detection sensor may detect face portions of a plurality of subjects in the imaging region, which are seen in the display region of the display unit 112 as viewed from the user and the distance measurement sensor may measure a distance to the face portion of each subject detected by the face detection sensor. In this case, a focus icon for each subject may be displayed on the display unit 112 (i.e., a plurality of focus icons are displayed on the display unit 112). That is, any number of focus icons can be displayed on the display unit 112.

Note that the focus icon can have any shape and may have, for example, a cross shape, a rectangular shape, or a circular shape or may have another shape.

Further, the display controller 234 may set the size of the display object according to the focal distance. That is, the focus icon displayed on the display unit 112 may be displayed with a size according to the depth position (i.e., focal distance). For example, the size of the focus icon may be reduced as the focal distance increases (in other words, the size of the focus icon may be increased as the focal distance decreases). That is, the focal distance may be expressed using the depth position and size of the focus icon.

The above-mentioned processing of the respective sections is controlled by the system controller 211. That is, as in the case of the imaging apparatus described in the first embodiment, the system controller 211 causes the imaging unit to adjust the focal distance. The system controller 211 causes the image generator to generate the left eye image and the right eye image of the stereoscopic image such that the display object is seen at the depth position corresponding to the focal distance. The system controller 211 causes the display unit, through which at least a part of the imaging region of the imaging unit can be seen in a see-through manner and which is configured to display the stereoscopic image formed of the left eye image and the right eye image, to display the left eye image and the right eye image of the stereoscopic image. Then, the system controller 211 causes the imaging unit to image the subject.

<Flow of Imaging>

Figure 3:
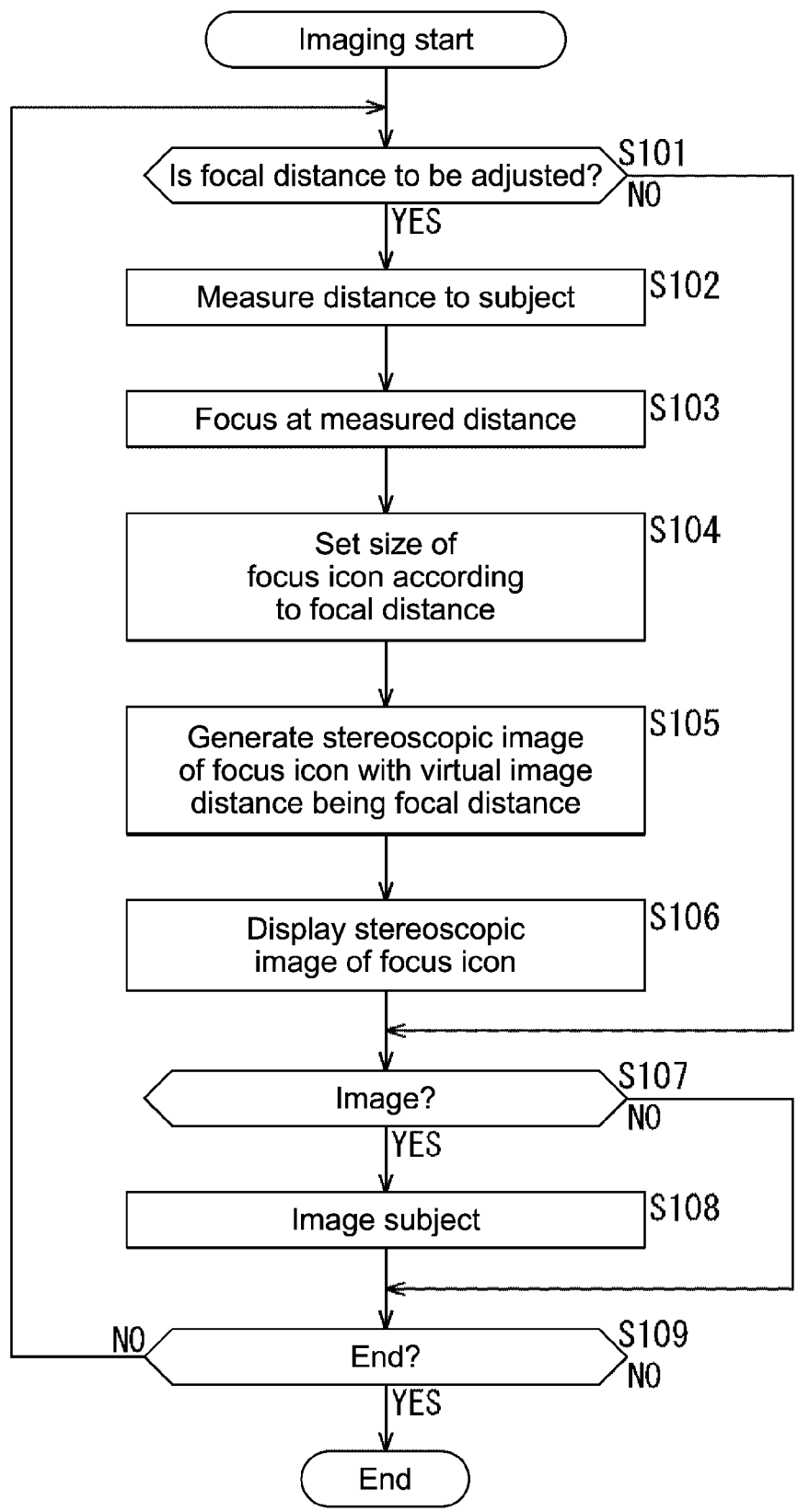
FIG. 3 is a flowchart showing an example of a flow of imaging.

When performing imaging, the system controller 211 controls the respective sections to perform the imaging-related processes as described above. A flow example of imaging will be described with reference to FIG. 3, and also FIGS. 4 to 6 if necessary. In the following description, it is assumed that the imaging unit 251 has an autofocus function, the sensor unit 221 measures a distance to a subject through the distance measurement sensor, and the imaging controller 253 causes the imaging unit 251 to adjust the focal distance to the measured distance.

When the imaging is started, in Step S101, the system controller 211 judges whether or not to adjust the focal distance. For example, if the sensor unit 221 receives an instruction to adjust the focal distance from the user, the processing of the system controller 211 proceeds to Step S102.

In Step S102, the system controller 211 controls the sensor unit 221 via the sensor controller 222 to measure the distance to the subject.

In Step S103, the system controller 211 controls the imaging unit 251 via the imaging controller 253 to adjust (set) the focal distance to the distance measured in Step S102. Note that, in the case of manual focus, the processing of Step S102 is omitted and the imaging unit 251 adjusts (sets) the focal distance according to a user's operation in Step S103.

In Step S104, the system controller 211 controls the display controller 234 to set the size of the focus icon to a size according to the distance measured in Step S102. Further, the system controller 211 controls the display controller 234 to set the binocular disparity and convergence angle of the focus icon such that the focus icon is displayed at a depth position corresponding to the distance (focal distance) measured in Step S102.

In Step S105, the system controller 211 controls the image generator 231 to generate a stereoscopic image of the focus icon. Then, the system controller 211 controls the display image processor 232 via the display controller 234 to apply the size, the binocular disparity, the convergence angle, and the like set in Step S104 to the focus icon generated by the image generator 231, to thereby generate the stereoscopic image of the focus icon with a distance from the user (see-through HMD 100) to a virtual image position (also referred to as virtual image distance) being the focal distance.

In Step S106, the system controller 211 controls the display drive unit 233 and the display unit 112 via the display controller 234 to cause the display unit 112 to display the stereoscopic image of the focus icon generated in Step S105. That is, the system controller 211 causes the right eye display unit 112A to display a right eye image of the focus icon and causes the left eye display unit 112B to display a left eye image of the focus icon.

With this, the focus icon is displayed on the display unit 112 such that the user can see the focus icon as if it is present at a position in the real space, which is at the focal distance from the see-through HMD 100 (user).

Figure 4:
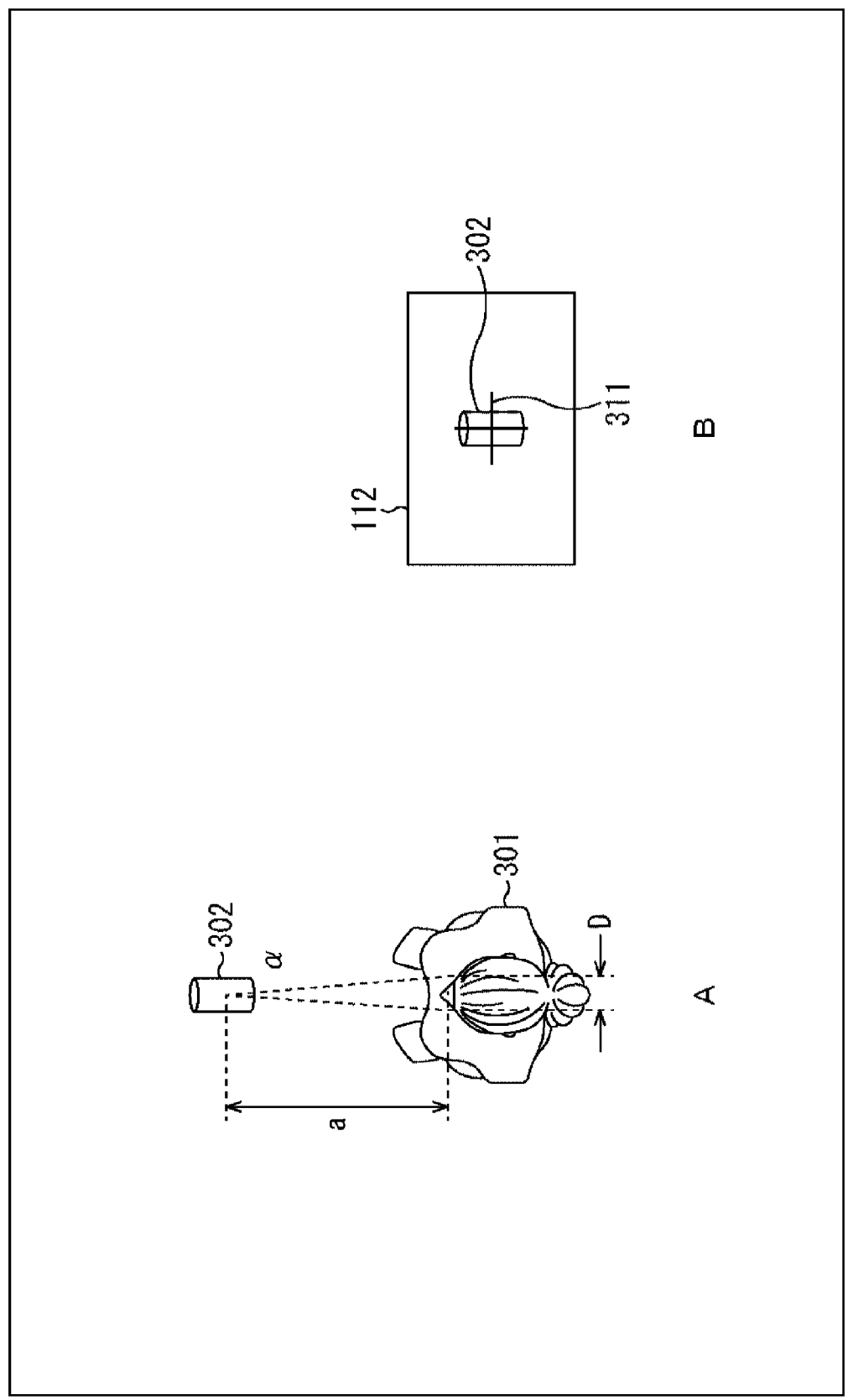
FIG. 4 is a view showing a display example of a focus icon.

For example, as shown in "A" of FIG. 4, if a distance from a user 301 (see-through HMD 100) to a subject 302 is detected as "a," the system controller 211 sets the binocular disparity and convergence angle of a focus icon 311 such that the virtual image distance of the focus icon 311 displayed on the display unit 112 is also "a." With this, as shown in "B" of FIG. 4, the focus icon 311 displayed on the display unit 112 looks to the user as if it is present at the same position as that of the subject 302. That is, the user can easily know that focus is achieved on the subject based on the virtual image position of the focus icon. That is, the user can more easily know the focal distance.

Figure 5:
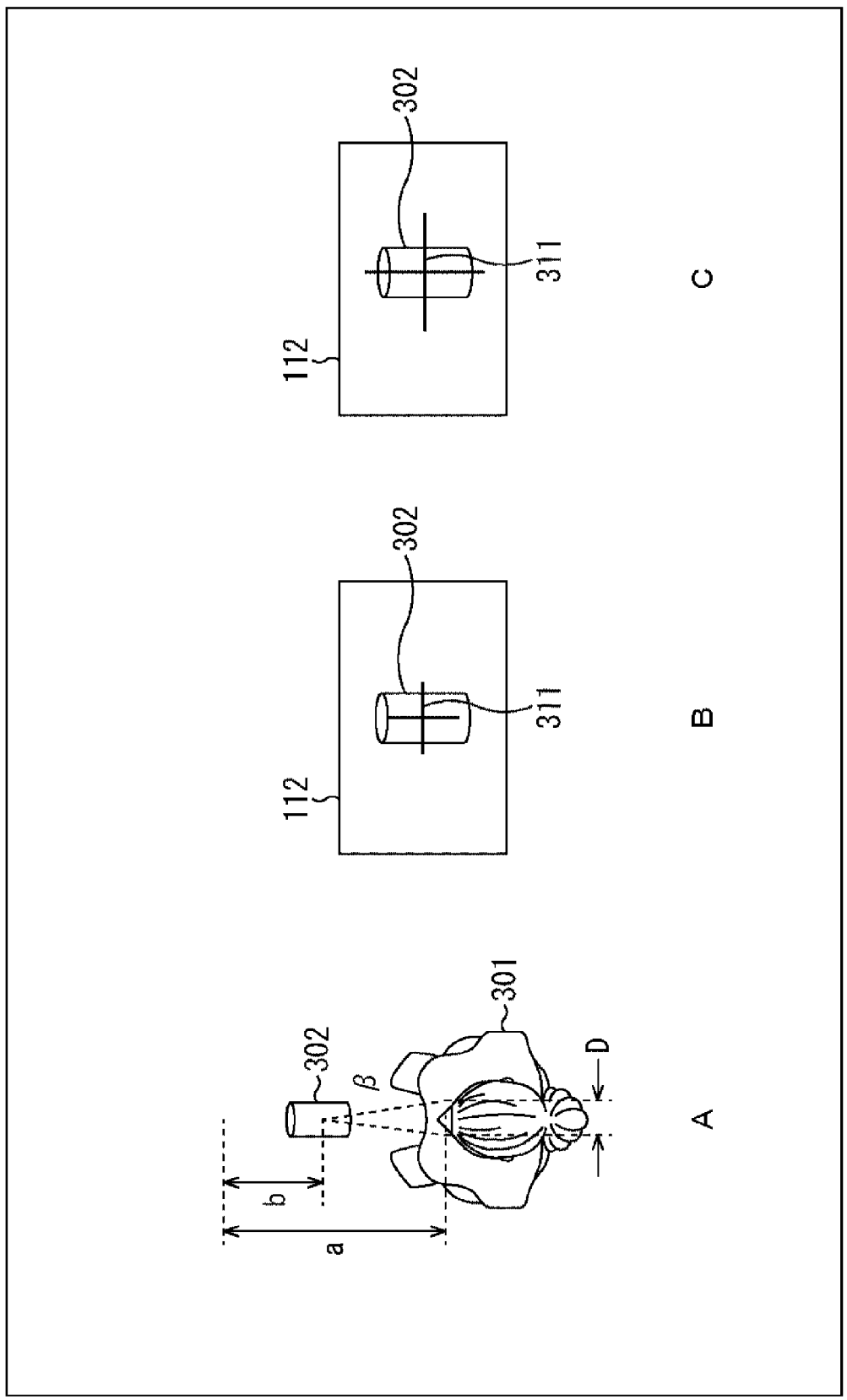
FIG. 5 is a view showing a display example of a focus icon.

If the subject 302 is displaced frontward by "b" from "a" as shown in FIG. 5, the system controller 211 controls the binocular disparity and convergence angle of the focus icon 311 to express the virtual image position of the focus icon 311 that is also displaced frontward by "b." At this time, the system controller 211 may control only the virtual image position of the focus icon 311 (settings of binocular disparity and convergence angle). It should be noted that, in this case, as in the example of "B" of FIG. 5, the subject 302 is increased in size in comparison with the case of "B" of FIG. 4 while the size of the focus icon 311 is not changed from the size shown in the example of "B" of FIG. 4. In other words, the size relationship between the subject 302 and the focus icon 311 is changed (the focus icon 311 becomes smaller in comparison with the subject 302). It may make the user uncomfortable. That is, the user may feel as if the focus icon 311 becomes farther because the focus icon 311 becomes smaller, though the virtual image position of the focus icon 311 becomes closer.

In view of this, the system controller 211 may change the size of the focus icon 311 displayed on the display unit 112 according to the virtual image position of the focus icon 311 as in the example of "C" of FIG. 5. For example, as the virtual image position of the focus icon 311 becomes closer (the virtual image distance decreases), the focus icon 311 may be displayed with a larger size. Note that the amount of change of the focus icon 311 may be proportional to the amount of change of the virtual image position or the amount of change may be changed depending on the virtual image position to emphasize the change in size. For example, as the virtual image position becomes closer, the amount of change in size of the focus icon 311 may be increased.

Figure 6:
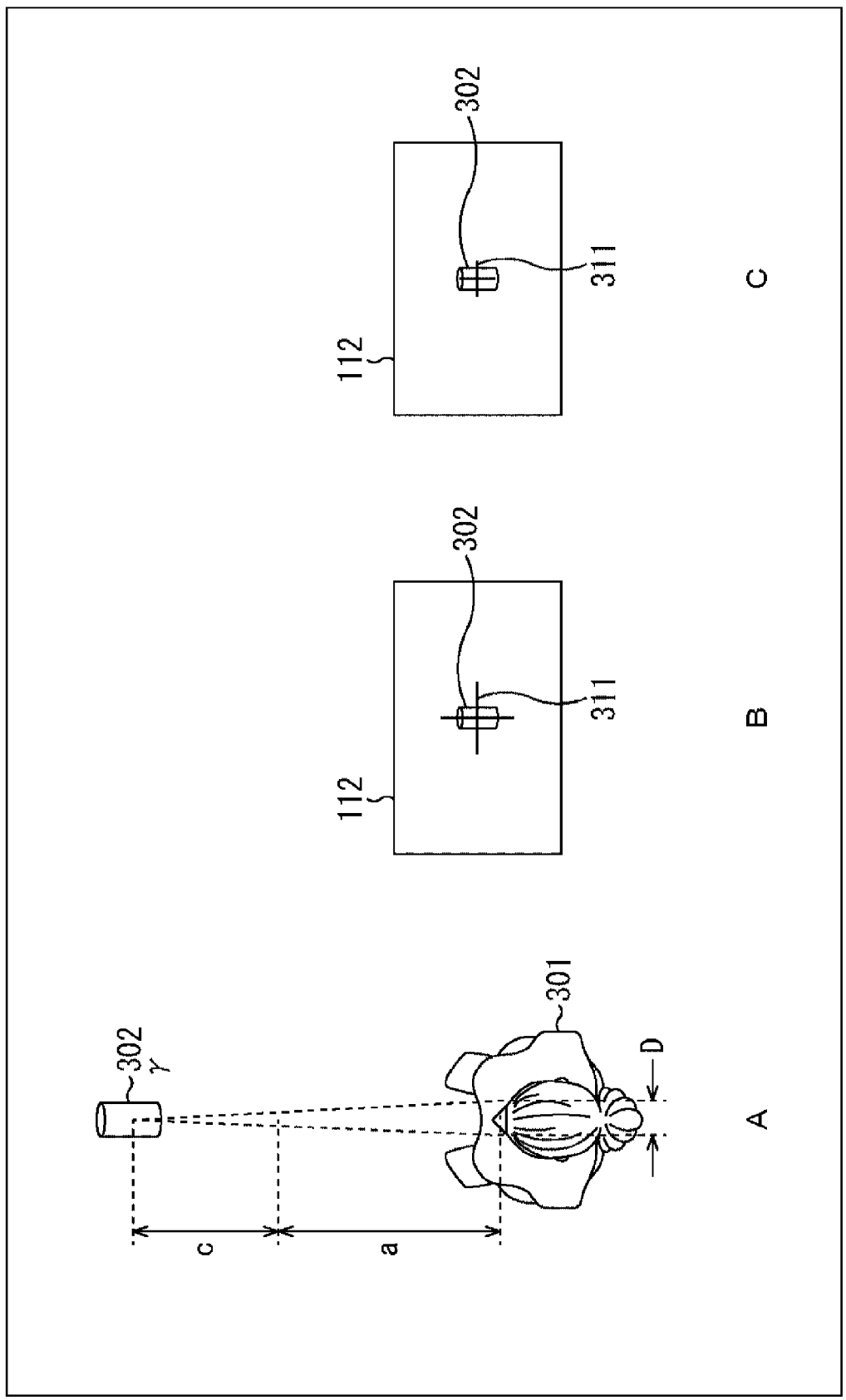
FIG. 6 is a view showing a display example of a focus icon.

Further, as shown in "A" of FIG. 6, if the subject 302 is displaced rearward by "c" from "a," the system controller 211 controls the binocular disparity and convergence angle of the focus icon 311 to express the virtual image position of the focus icon 311 that is also displaced rearward by "c." At this time, the system controller 211 may control only the virtual image position of the focus icon 311 (settings of binocular disparity and convergence angle). It should be noted that, in this case, as in the example of "B" of FIG. 6, the subject 302 becomes smaller than that in the case of "B" of FIG. 4 while the size of the focus icon 311 is not changed from the size shown in the example of "B" of FIG. 4. In other words, the size relationship between the subject 302 and the focus icon 311 is changed (the focus icon 311 is increased in size in comparison with the subject 302). It may make the user uncomfortable. That is, the user may feel the focus icon 311 closer because the focus icon 311 becomes larger, though the virtual image position of the focus icon 311 becomes farther.

In view of this, as in the example of "C" of FIG. 6, the system controller 211 may change the size of the focus icon 311 displayed on the display unit 112 according to the virtual image position of the focus icon 311. For example, as the virtual image position of the focus icon 311 becomes farther (the virtual image distance increases in size), the focus icon 311 may be displayed with a smaller size. Note that the amount of change in size of the focus icon 311 may be proportional to the amount of change in the virtual image position (constant irrespective of the virtual image position) or the amount of change may be changed depending on the virtual image position for emphasizing the change in size. For example, as the virtual image position becomes farther, the amount of change in size of the focus icon 311 may be decreased.

Note that the virtual image distance (virtual image position) of the focus icon 311 can be changed by the system controller 211 changing the display position of the focus icon 311 in each of the right eye image and the left eye image. For example, it is assumed that the convergence angle when the virtual image distance is indicated by "a" is α as in "A" of FIG. 4, the convergence angle when the subject 302 becomes closer to the user by "b" from the virtual image distance "a" is β as in "A" of FIG. 5, the convergence angle when the subject 302 becomes farther from the user by "c" from the virtual image distance "a" as in "A" of FIG. 6 is γ, and a distance between the left and right pupils is D. Provided that D=61.5 mm and "a"=4000 mm, α=53 minutes.

Provided that an amount corresponding to one pixel in the display unit 112 (each of the right eye display unit 112A and the left eye display unit 112B) is three minutes, when the display position of the focus icon 311 is displaced from the predetermined position horizontally inwards by an amount corresponding to one pixel, γ=56 minutes and "b"=225 mm.

Further, when the display position of the focus icon 311 in the display unit 112 (each of the right eye display unit 112A and the left eye display unit 112B) is displaced from the predetermined position horizontally outwards by an amount corresponding to one pixel, γ=50 minutes and c=228 mm.

As described above, the convergence angle is changed by changing the display position of the focus icon, and hence the virtual image distance can be changed to any distance.

For example, if the system controller 211 does not completely adjust the virtual image distance of the focus icon 311 to the distance between the user 301 (see-through HMD 100) and the subject 302 that is measured in distance measurement, as long as the front and rear relationship between the focus icon 311 and the subject 302 is constant, it helps the user to know a focused position. Thus, also in this case, the same effects can be provided.

Note that, for example, after the focal distance adjustment, for example, if the user 301 changing the direction of the see-through HMD 100 (i.e., imaging direction) and an object of the real space is positioned in front of the position at which the focus icon 311 is seen to be present in the display region of the display unit 112, the system controller 211 may be configured not to display a portion of the focus icon 311, which overlaps with the object for expressing the front and rear relationship. For example, if the positional relationship between the focus icon 311 and the object of the real space becomes a relationship in which the focus icon 311 is entirely hidden by the object, the system controller 211 may be configured not to display the focus icon 311.

Referring back to FIG. 3, if the processing of Step S106 ends, the processing proceeds to Step S107. Further, if it is judged in Step S101 that the focal distance is not to be adjusted because, for example, the instruction is not received from the user, the processing proceeds to Step S107.

In Step S107, the system controller 211 judges whether or not to image the subject. For example, if the sensor unit 221 receives an instruction to image the subject from the user, the processing of the system controller 211 proceeds to Step S108.

In Step S108, the system controller 211 controls the imaging unit 251 via the imaging controller 253 to image the subject and generates image data of the captured image.

When the image data of the captured image is obtained, the processing proceeds to Step S109. Further, if it is judged in Step S107 that the subject is not to be imaged because, for example, the sensor unit 221 does not receive the instruction to image the subject from the user, and the processing of the system controller 211 proceeds to Step S109.

In Step S109, the system controller 211 judges whether or not to terminate the imaging. For example, if it is judged that imaging is to be continued because the sensor unit 221 does not receive an instruction to terminate imaging from the user or the like, the processing of the system controller 211 returns to Step S101 and the subsequent processing is performed.

Further, if it is judged in Step S109 that the imaging is to be terminated because, for example, the sensor unit 221 receives the instruction to terminate the imaging from the user or the like, the system controller 211 terminates the imaging.

By performing the imaging in the above-mentioned manner, the see-through HMD 100 (system controller 211) is capable of controlling the respective sections to control the binocular disparity and convergence angle such that the virtual image distance of the stereoscopic image of the focus icon indicating the focal distance is adjusted to the focal distance, and causing the display unit 112 to display it. With this, the user can more easily know the focal distance.

<Specific Example of Focal Distance Adjustment>

Figure 7:
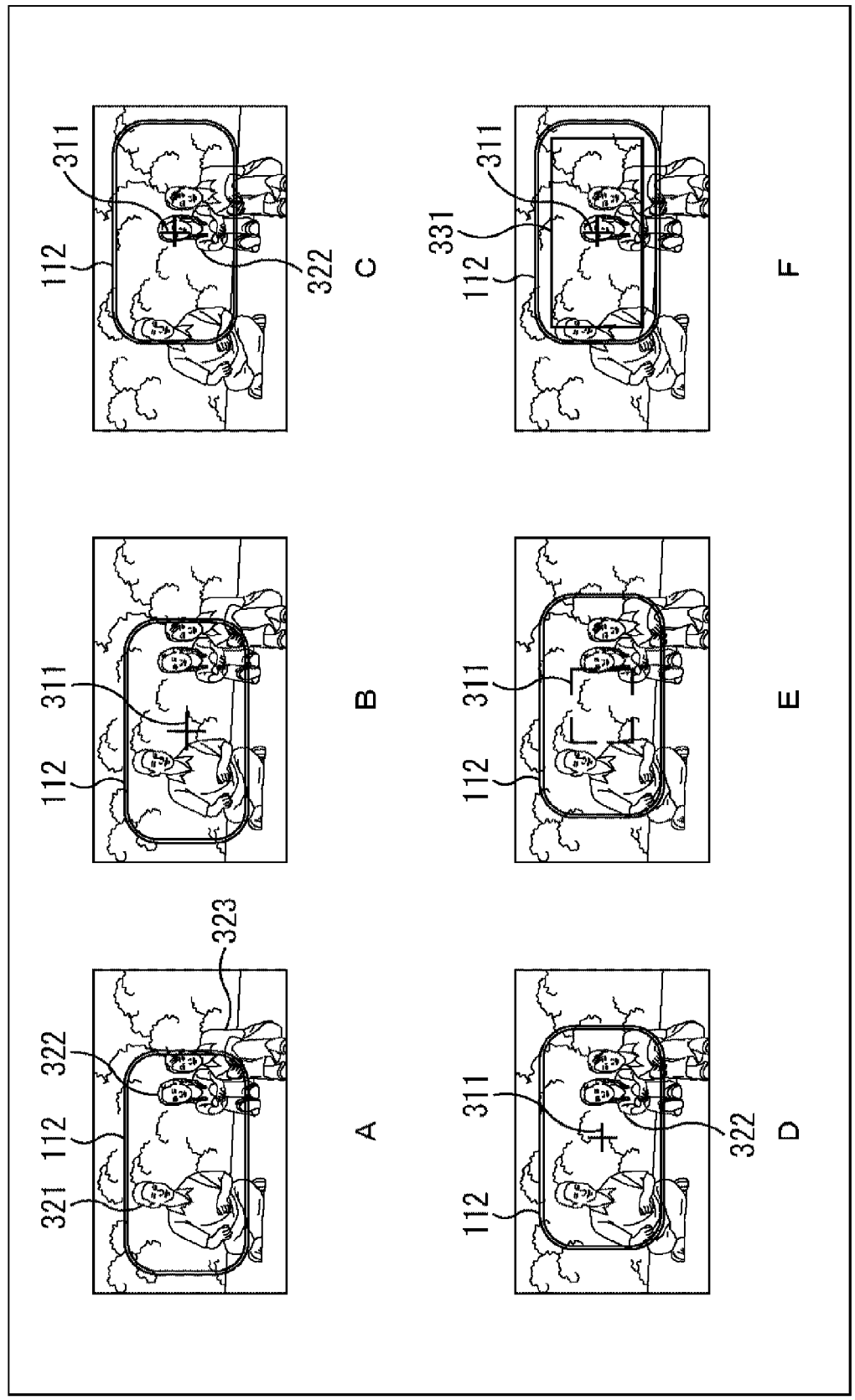
FIG. 7 is a view explaining how to image as an example.

Next, how to adjust the focal distance will be described as an example. The position of the focus icon 311 may be fixed to the predetermined position (e.g., center) in the display region of the display unit 112. FIG. 7 shows the example.

For example, as in "A" of FIG. 7, it is assumed that there are subjects 321 to 323 that are objects of the real space in the display region of the display unit 112. By the user inputting an instruction, for example, the camera function is activated. Then, as shown in "B" of FIG. 7, for example, the focus icon 311 is displayed at the center of the display region of the display unit 112.

As shown in "C" of FIG. 7, the user changes the direction of the see-through HMD 100 (imaging direction) by changing the direction of the face such that the focus icon 311 is overlapped with the desired subject 322.

In this state, the measurement of the focal distance is executed and then a distance to the subject 322 is measured. The binocular disparity and convergence angle of the focus icon 311 and the size of the focus icon 311 are adjusted such that the virtual image distance of the focus icon 311 coincides with the measured distance to the subject 322. With this, as shown in "C" of FIG. 7, the virtual image position and size of the focus icon 311 displayed on the display unit 112 are changed depending on the distance to the subject 322 and the user is informed of the fact that focus is achieved on the subject 322. At this time, a sound feedback may be given.

In this state, the user or the like instructs to capture an image, and then the image is captured and image data of the captured image is obtained. The execution instruction of the focal distance adjustment or imaging as described above are input by the user touching the see-through HMD 100 or a device relating to an imaging function thereof, operating a multi-stage press button, or uttering voice. Note that the focal distance may be adjusted and the camera function may be activated as processes before the subject is imaged.

Note that an instruction input of the user or the like is necessary for a trigger of the focal distance adjustment, from the state of "C" of FIG. 7, as in "D" of FIG. 7, even when the user changes the direction of the see-through HMD (imaging direction) by changing the direction of the face and displaces the focus icon 311 from the subject 322, the focal distance is maintained. That is, also in the state of "D" of FIG. 7, focus is achieved on the subject 322.

With this configuration, the user can more freely set the composition of the captured image while more easily maintaining the focal distance.

Note that the focus icon 311 can have any shape. For example, as shown in "E" of FIG. 7, the focus icon 311 may be rectangular. Further, for example, as shown in "F" of FIG. 7, not only the focus icon 311 but also a rectangular frame 331 that is an image showing the field angle of the captured image may be displayed on the display unit 112. Note that this image does not need to be the stereoscopic image.

Further, the display position of the focus icon 311 in the display region may be variable. For example, the display position of the focus icon 311 (position of object as target to which focal distance is adjusted) may be linked with the line-of-sight of the user (focus is achieved on subject in direction of line-of-sight of user). An example thereof will be shown in FIG. 8.

Figure 8:
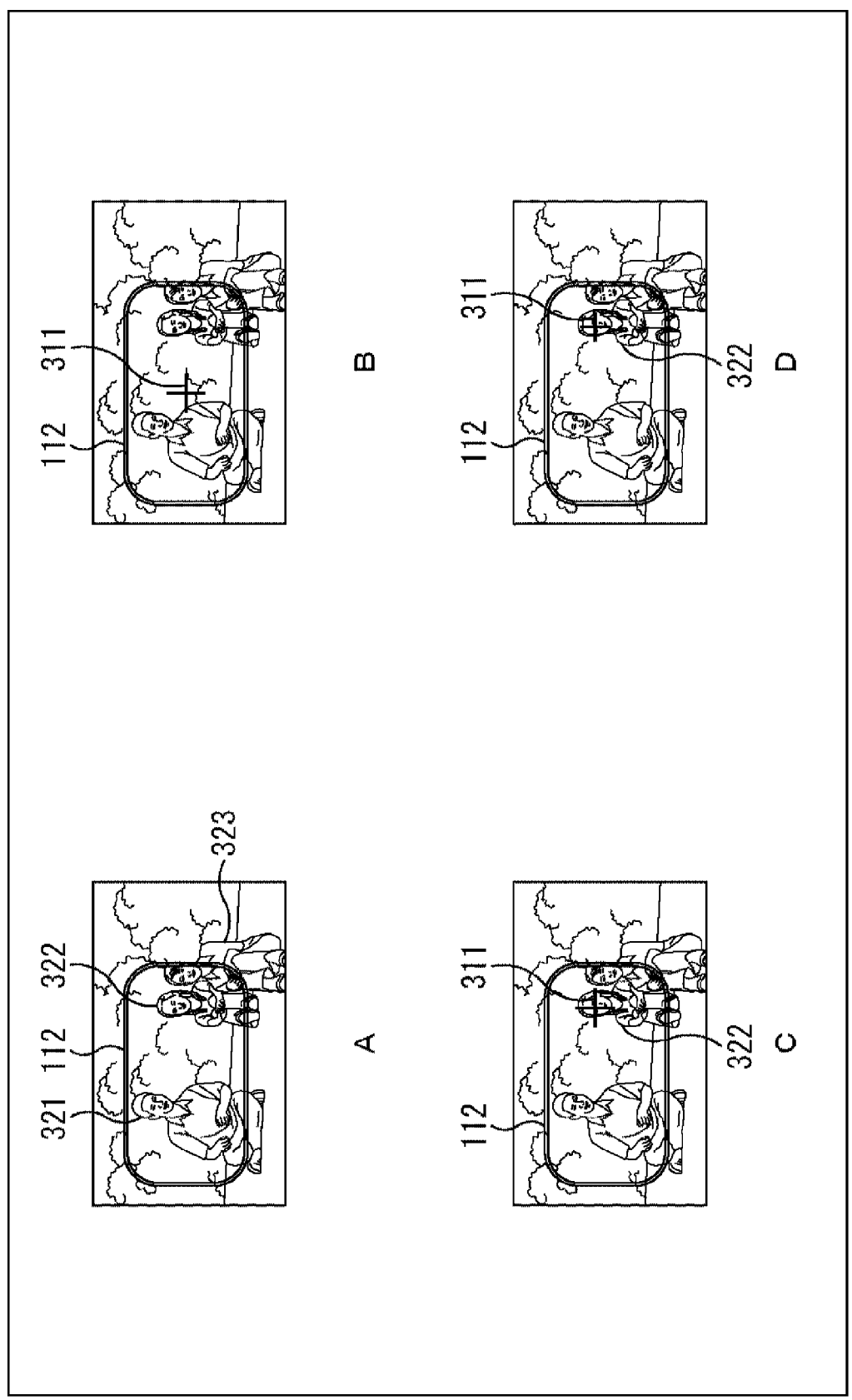
FIG. 8 is a view explaining how to image as another example.

For example, as shown in "A" of FIG. 8, it is assumed that there are subjects 321 to 323 that are objects of the real space in the display region of the display unit 112 as in "A" of FIG. 7. By the user inputting an instruction, for example, the camera function is activated. Then, as shown in "B" of FIG. 8, for example, the focus icon 311 is displayed at the center of the display region of the display unit 112.

In this state, as shown in "C" of FIG. 8, the user moves the line-of-sight. Then, the sensor unit 221 detects the line-of-sight and the focus icon 311 is moved to the position corresponding to the line-of-sight. In the example of "C" of FIG. 8, the user directs the line-of-sight to the subject 322. Therefore, the focus icon 311 is moved to a position overlapping with the subject 322.

In this state, when the measurement of the focal distance is executed, as in the example of FIG. 7, a distance to the subject 322 is measured. The binocular disparity and convergence angle of the focus icon 311 and the size of the focus icon 311 are adjusted such that the virtual image distance of the focus icon 311 coincide with the measured distance to the subject 322. With this, as shown in D of FIG. 8, the virtual image position and size of the focus icon 311 displayed on the display unit 112 are changed to a distance to the subject 322 and the user is informed of the fact that focus is achieved on the subject 322. At this time, a sound feedback may be given.

With this configuration, the user can more freely set the composition of the captured image while more easily maintaining the focal distance.

Of course, also in the example of FIG. 8, as in FIG. 7, even if the direction of the line-of-sight is changed, the focal distance may be fixed unless the user or the like inputs an instruction of the focal distance adjustment. Also in this case, the focus icon 311 can have any shape. Further, for example, not only the focus icon 311 but also a rectangular frame 311 that is an image showing the field angle of the captured image may be displayed on the display unit 112. Note that this image does not need to be the stereoscopic image.

Although the display unit 112 is the see-through display that is light transmissive has been described above, the display unit 112 may be a non-see-through display that is not light transmissive. For example, on the display unit 112 (non-see-through display), the display object (focus icon) may be displayed overlapped on a captured image (also referred to as through-image) obtained by the imaging unit 251. Also in this case, as in the above-mentioned see-through display, it is only necessary to adjust the binocular disparity, convergence angle, size, and the like such that the virtual image position of the display object (focus icon) is a position corresponding to the focal distance. That is, the present technology is applicable not only to the see-through HMD 100 but also to a non-see-through HMD, for example.

The above-mentioned series of processing may be executed by hardware or may be executed by software. If the above-mentioned series of processing is executed by software, programs configuring the software is installed from a network or a storage medium.

The storage medium is, in addition to the apparatus main body, configured by, for example, the removable medium 264 in which the programs are stored, which is distributed for delivering the programs to the user as shown in FIG. 2. The removable medium 264 includes a magnetic disc (including flexible disc) and an optical disc (including CD-ROM and DVD). In addition, the removable medium 264 includes a magneto-optical disc (including mini disc (MD)), a semiconductor memory, and the like.

In this case, the programs can be installed into the storage unit 261 by a removable medium thereof being mounted on a drive.

Further, the programs can also be provided via a wired or wireless transmission medium such as a local area network, the Internet, and digital terrestrial broadcasting. In this case, the programs can be received by the communication unit 262 of each apparatus and installed into the storage unit 261.

The programs may be installed into the ROM of the system controller 211 or the storage unit 261 in advance.

Note that the programs executed by the computer may be programs for performing processing in a time series in the order described herein or may be programs for performing processing in parallel or at a necessary timing, for example, when called.

Further, a step of describing the programs stored in the storage medium includes processes performed in a time series in the order described herein, of course. However, the processes do not necessarily need to be processed in a time series and may be performed in parallel or individually.

Further, the processes of the above-mentioned steps can be performed by each of the above-mentioned apparatuses or any apparatus other than the above-mentioned apparatuses. In this case, the apparatus that performs the processes only needs to have the above-mentioned functions (functional blocks, etc.) necessary for performing the processes. Further, it is only necessary to appropriately transmit information necessary for the processes to the apparatus.

Further, in the specification, the system means a collection of a plurality of components (apparatuses, modules (parts), etc.) and all the components do not necessarily need to be in the same casing. Thus, a plurality of apparatuses housed in individual casings and connected via a network and a single apparatus including a plurality of modules housed in one casing are both the system.

Alternatively, the component described above as a single apparatus (or processors) may be divided and configured as a plurality of apparatuses (or processors). In contrast, the components described as a plurality of apparatuses (or processors) described above may be collected and configured as a single apparatus (or processors). Further, a component other than those described above may be added to the components of each apparatus (or each processor). In addition, as long as substantially the same components and operations are provided in the entire system, some of the components of a certain apparatus (or processor) may be included in other apparatuses (or other processors).

Although favorable embodiments of the present disclosure have been described above in details with reference to the accompanied drawings, the technical range of the present disclosure is not limited to the above-mentioned examples. It is clear that those skilled in the art can achieve various changed or modified examples without departing from the technical concept defined by the scope of claims. Of course, it should be understood that the changed or modified examples fall in the technical range of the present disclosure.

For example, the present technology can take a cloud computing configuration in which a single function is shared and processed by a plurality of apparatuses via a network.

Further, the steps described above referring to the flowchart can be performed by a single apparatus or shared and performed by a plurality of apparatuses.

In addition, if a single step includes a plurality of processes, the plurality of processes of the single step can be performed by a single apparatus or shared and performed by a plurality of apparatuses.

Further, the present technology is not limited thereto and can be carried out as such an apparatus or any component incorporated in an apparatus configuring the system. For example, the present technology can be carried out as a processor serving as a system large scale integration (LSI), a module using a plurality of processors or the like, a unit using a plurality of modules or the like, or a set obtained by adding other functions (i.e., some components of apparatus) to the unit.

Note that the present technology may also take the following configurations.

(1) An imaging apparatus, including:
an imaging unit;
a display unit, through which at least a part of an imaging region of the imaging unit can be seen in a see-through manner and which is configured to display a stereoscopic image formed of a left eye image and a right eye image;
a focal distance adjustment unit configured to adjust a focal distance of the imaging unit; and
a display controller configured to generate the left eye image and the right eye image such that a display object indicating the focal distance is seen at a depth position corresponding to the focal distance and cause the display unit to display the left eye image and the right eye image.

(2) The imaging apparatus according to any one of (1) and (3) to (12), in which
the display controller is configured to set a size of the display object according to the focal distance.

(3) The imaging apparatus according to any one of (1), (2), and (4) to (12), in which
the display unit includes
a left eye image display unit configured to display the left eye image, and
a right eye image display unit configured to display the right eye image.

(4) The imaging apparatus according to any one of (1) to (3) and (5) to (12), in which
the imaging apparatus includes a casing that is mounted on a head of a user such that the left eye image display unit is positioned near in front of a left eye of the user and the right eye image display unit is positioned near in front of a right eye of the user.

(5) The imaging apparatus according to any one of (1) to (4) and (6) to (12), in which
the display controller is configured to cause the display unit to further display an image indicating an imaging field angle of the imaging unit.

(6) The imaging apparatus according to any one of (1) to (5) and (7) to (12), in which
the focal distance adjustment unit is configured to be operated by a user to adjust the focal distance.

(7) The imaging apparatus according to any one of (1) to (6) and (8) to (12), further including
a distance measurement unit configured to measure a distance to a subject, in which
the focal distance adjustment unit is configured to adjust the focal distance to the distance measured by the distance measurement unit.

(8) The imaging apparatus according to any one of (1) to (7) and (9) to (12), in which
the distance measurement unit is configured to measure a distance to the subject at a predetermined position in the imaging region.

(9) The imaging apparatus according to any one of (1) to (8) and (10) to (12), in which
the predetermined position is a position in the imaging region, which is seen at a center of a display region of the display unit.

(10) The imaging apparatus according to any one of (1) to (9), (11), and (12), further including
a face detector configured to detect a face of the subject, in which
the distance measurement unit is configured to measure a distance to the face of the subject detected by the face detector.

(11) The imaging apparatus according to any one of (1) to (10) and (12), further including
a line-of-sight detector configured to detect a line-of-sight direction of the user, in which
the distance measurement unit is configured to measure a distance to the subject in the line-of-sight direction of the user detected by the line-of-sight detector.

(12) The imaging apparatus according to any one of (1) to (11), further including
an instruction reception unit configured to receive an execution instruction of measurement of the distance to the subject, in which
the distance measurement unit is configured to measure the distance to the subject based on the execution instruction received by the instruction reception unit.

(13) An imaging method, including:
adjusting a focal distance of an imaging unit;
generating a left eye image and a right eye image such that a display object indicating the focal distance is seen at a depth position corresponding to the focal distance and causing a display unit, through which at least a part of an imaging region of the imaging unit can be seen in a see-through manner and which is configured to display a stereoscopic image formed of the left eye image and the right eye image, to display the left eye image and the right eye image; and imaging a subject by the imaging unit.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus, comprising:
    an imaging unit configured to image a real subject included in an imaging region;
    a display unit configured to display a stereoscopic display image formed of a left eye image and a right eye image in at least one see-through display;
    a focal distance adjustment unit configured to adjust a focal distance of the imaging unit; and
    a display controller configured to control the display unit to:
        increase a size of a stereoscopic display object as a virtual image position of the stereoscopic display object approaches closer to the imaging apparatus, wherein the virtual image position corresponds to the focal distance; and
        at least partially overlap the stereoscopic display object on the real subject when seen through the at least one see-through display.

2. The imaging apparatus according to claim 1, wherein the display controller is configured to set the size of the stereoscopic display object according to the focal distance.

3. The imaging apparatus according to claim 1, wherein the display unit includes:
    a left eye image display unit configured to display the left eye image, and
    a right eye image display unit configured to display the right eye image.

4. The imaging apparatus according to claim 3, wherein the imaging apparatus includes a casing that is configured to be mounted on a head of a user such that the left eye image display unit is positioned near in front of a left eye of the user and the right eye image display unit is positioned near in front of a right eye of the user.

5. The imaging apparatus according to claim 1, wherein the display controller is configured to cause the display unit to further display an image indicating an imaging field angle of the imaging unit.

6. The imaging apparatus according to claim 1, wherein the focal distance adjustment unit is configured to be operated by a user to adjust the focal distance.

7. The imaging apparatus according to claim 1, further comprising
    a distance measurement unit configured to measure a distance to the real subject, wherein
    the focal distance adjustment unit is configured to adjust the focal distance to the distance measured by the distance measurement unit.

8. The imaging apparatus according to claim 7, wherein the distance measurement unit is configured to measure a distance to the real subject at a predetermined position in the imaging region.

9. The imaging apparatus according to claim 8, wherein the predetermined position is a position in the imaging region, which is seen at a center of a display region of the display unit.

10. The imaging apparatus according to claim 7, further comprising
    a face detector configured to detect a face of the real subject, wherein
    the distance measurement unit is configured to measure a distance to the face of the real subject detected by the face detector.

11. The imaging apparatus according to claim 7, further comprising
    a line-of-sight detector configured to detect a line-of-sight direction of a user, wherein
    the distance measurement unit is configured to measure a distance to the real subject in the line-of-sight direction of the user detected by the line-of-sight detector.

12. The imaging apparatus according to claim 7, further comprising
    an instruction reception unit configured to receive an execution instruction of measurement of the distance to the real subject, wherein
    the distance measurement unit is configured to measure the distance to the real subject based on the execution instruction received by the instruction reception unit.

13. An imaging method, comprising:
    adjusting a focal distance of an imaging unit;
    increasing a size of a stereoscopic display object as a virtual image position of the stereoscopic display object approaches closer to an imaging apparatus, wherein the virtual image position corresponds to the focal distance;
    displaying a stereoscopic display image formed of the left eye image and the right eye image in at least one see-through display;
    imaging a real subject by the imaging unit; and
    at least partially overlapping the stereoscopic display object on the real subject when seen through the at least one see-through display.

14. The imaging apparatus according to claim 1, wherein the display unit is configured to serially change the size of the stereoscopic display object with respect to change of the virtual image position.

15. The imaging apparatus according to claim 14, wherein the display unit is configured to proportionally increase the size of the stereoscopic display object as the virtual image position of the stereoscopic display object approaches closer to the imaging apparatus.

* * * * *